Aug. 3, 1937. C. C. STRANGE 2,088,880
LEVER MECHANISM
Filed Aug. 29, 1933 2 Sheets-Sheet 1
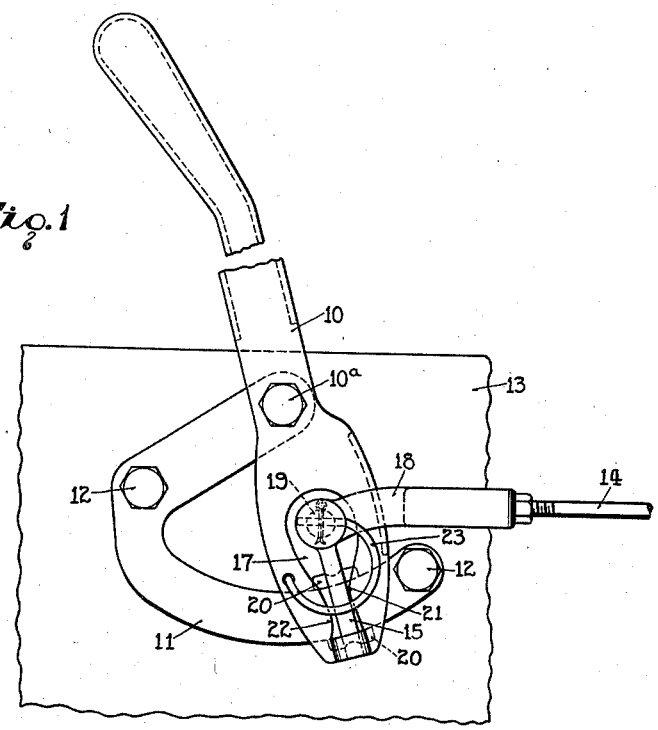
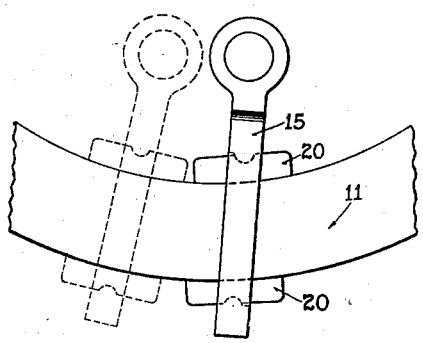
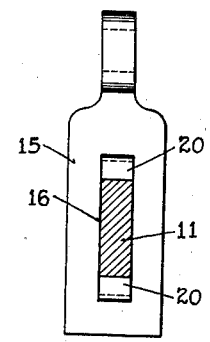
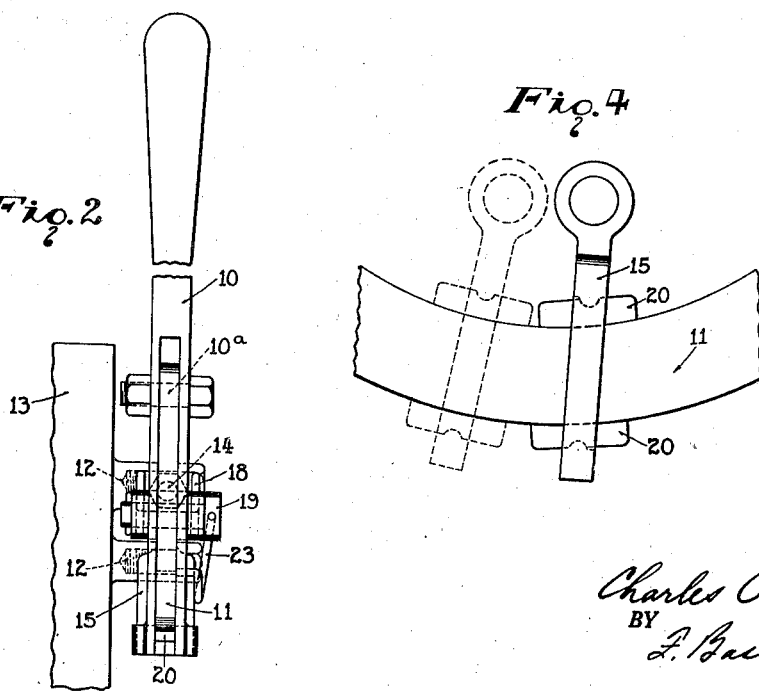
INVENTOR.
Charles C. Strange
BY
L. Bascom Smith
ATTORNEY Aug. 3, 1937.  C. C. STRANGE  2,088,880
LEVER MECHANISM
Filed Aug. 29, 1933   2 Sheets-Sheet 2
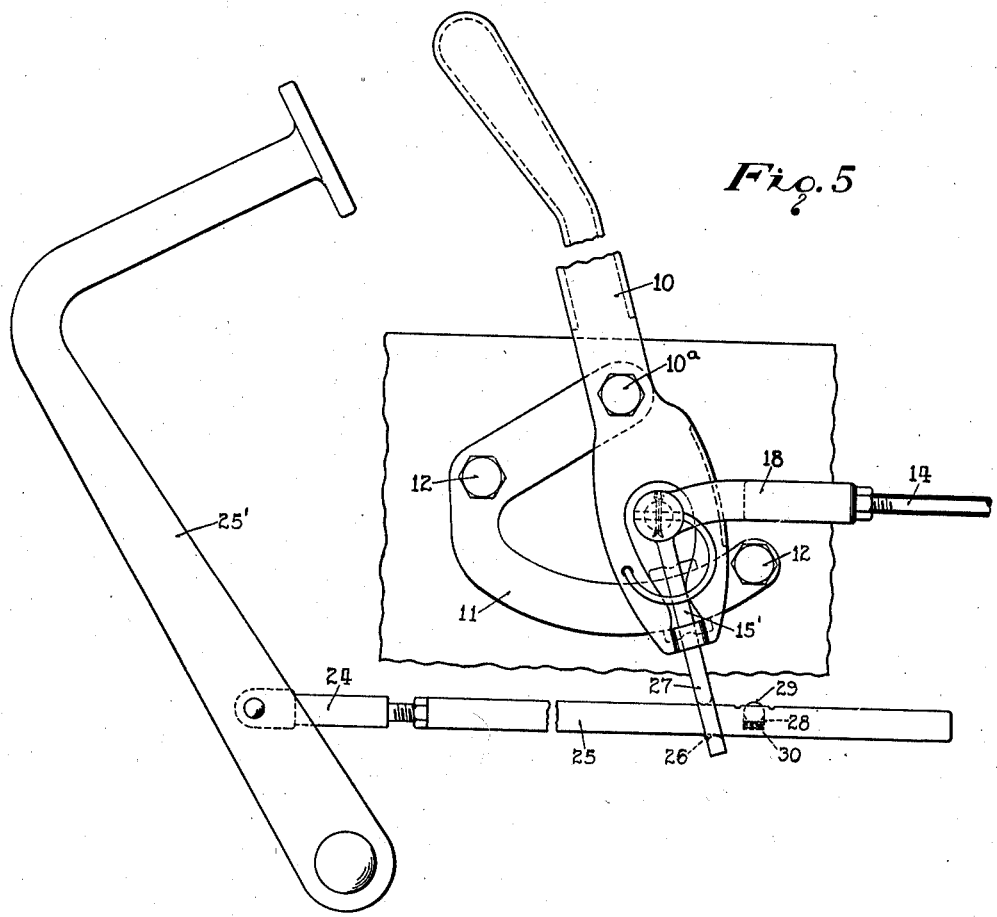
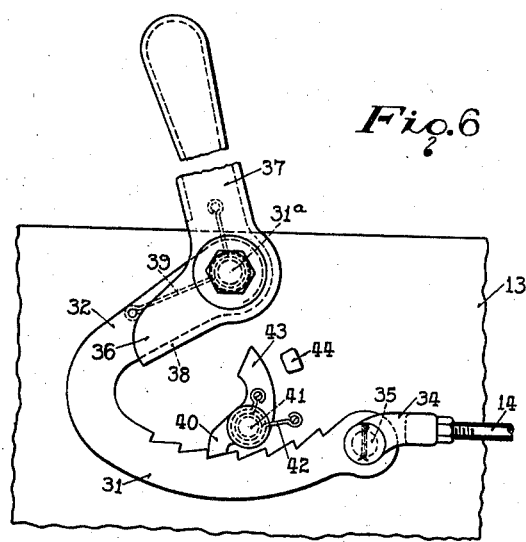
INVENTOR.
Charles C. Strange
BY
F. Bascom Smith
ATTORNEY Patented Aug. 3, 1937

2,088,880

UNITED STATES PATENT OFFICE 2,088,880

LEVER MECHANISM

Charles C. Strange, Port Richmond, Staten Island, N. Y.

Application August 29, 1933, Serial No. 687,327

6 Claims. (Cl. 74—531)

This invention relates to locking mechanism and more particularly to the combination therewith of control means for actuating the same.

One of the objects of the present invention is to provide novel control means for friction locking apparatus.

Another object is to provide novel control means for actuating the brakes of a vehicle and for maintaining the same in applied position.

Still another object is to provide a novel combination of locking means and actuating means therefor for transmitting motion to a resistance member and holding the same in any desired position.

A further object is to provide novel mechanism for actuating and locking a resistance member such as the brake rod of a vehicle which mechanism may be easily actuated, and is very compact.

A still further object is to provide novel means for actuating the brake mechanism of a vehicle whereby the same may be released with ease and rapidity.

Still another object is to provide novel brake actuating means whereby maximum braking pressure is insured and the possibility of accidental release of the same is substantially eliminated.

The above and further objects and novel features of the invention will appear more fully from the following detailed description taken in connection with the accompanying drawings. It is to be expressly understood, however, that the drawings are for the purpose of illustration only and are not designed as a definition of the limits of the invention, reference being primarily had for this purpose to the appended claims.

In the drawings wherein like reference characters refer to like parts throughout the several views:

Fig. 1 is a side elevation, with parts broken away, of one form of device embodying the present invention;

Fig. 2 is an end view with parts broken away as seen looking toward the right in Fig. 1;

Fig. 3 is a detail view illustrating one form of locking means which may be employed in carrying out the present invention;

Fig. 4 is a detail view showing the locking means in operative and inoperative position;

Fig. 5 is a side view of another embodiment of the invention; and

Fig. 6 is a side view of a third embodiment showing a different form of locking means.

One embodiment of the present invention is illustrated in Fig. 1, by way of example, in the form of a novel combination comprising a standing brake lever of the type usually employed for actuating the emergency brakes of a vehicle and locking means therefor. Heretofore apparatus of this nature has been constituted in the main by levers adapted to be locked by means of a pawl and ratchet, the pawl being actuated by an auxiliary handle mounted on the upper end of the lever. The levers employing such holding means although in common use on all types of machinery have been found to possess a number of disadvantages. For example, it is oftentimes extremely difficult to release the same from locked position and the releasing is always a comparatively slow operation. Furthermore, it is often impossible to lock the lever in the exact position desired and the pawl, due to the type of operating means therefor, quite frequently fails to properly engage the ratchet when the lever is moved to operative position. The present invention comprehends means whereby the above and other disadvantages are overcome.

In the embodiment illustrated in Fig. 1, a brake lever 10, preferably constituted by a single sheet metal stamping folded to the desired shape, is pivotally mounted by means of a suitable pin 10ᵃ on bar 11 which is in turn rigidly secured by any suitable means such as bolts 12 to a frame member 13 of a vehicle. A portion of bar 11 is in the form of an arc of a circle, the center of curvature of which lies at the pivotal point of lever 10. The lower end of the latter is shown bifurcated, the opposed sections extending downwardly on either side of bar 11.

Novel means are provided for operatively associating lever 10 with a resistance member such as a brake tension rod 14 of a vehicle, said rod being connected to the vehicle brakes, not shown. Such means, in the form illustrated, are constituted by a movable holding or locking member 15 provided with a transverse opening 16 therein for receiving the arcuate portion of bar 11 (Fig. 3). The edges of member 15 extend laterally from bar 11 into openings 17 in the bifurcated sections of lever 10, the latter being adapted to engage member 15 to move the same back and forth along bar 11 in a manner to be hereinafter pointed out. The upper end of member 15 is pivotally secured to the end of resistance rod 14 through the medium of a bifurcated member 18 and a pivot pin 19.

The opening 16 in member 15 is longer than the width of bar 11, the same preferably being large enough to permit the insertion of a pair of shoes 20, a small clearance being allowed between the faces of said shoes and the edges of bar 11. Thus under the influence of the tension rod 14 the upper end of member 15 is held toward the right as seen in full lines in Fig. 4, said member thus assuming an angular position relative to bar 11. When so positioned the gripping action of member 15 on bar 11 is effective to prevent movement of the former along the latter. It will be readily seen that when member 15 is maintained under pressure in a position such as shown in full lines (Fig. 4), the ends of opening 16 will engage or hold shoes 20 in close frictional engagement with bar 11 to effect the gripping action. When, however, member 15 is moved to a position approaching the normal to bar 11, the dotted line position, the clearance between the latter and shoes 20 is sufficient to permit said member to be readily moved along bar 11. Shoes 20 are provided chiefly for the purpose of preventing unnecessary wear on member 15 and bar 11 since in one commercial embodiment of the invention, member 15 is only moved toward a position normal to bar 11 until the friction between said bar and member is sufficiently reduced to be overcome by the pressure being applied to the upper end of lever 10. Shoes 20 also provide a large engaging area to insure against accidental release of the lever.

In order that the locking member may be controlled by movement of lever 10, thereby eliminating the necessity for any additional means for releasing said member, the contour of the walls of openings 17 in the lower end of lever 10 is designed to accomplish such purpose. As shown, the right-hand wall of the opening is cut so that a bulging portion 21 (Fig. 1) is adapted to engage member 15 at a point adjacent the upper edge of bar 11 upon the initial movement of lever 10 in a clock-wise direction for applying the brakes. When moving lever 10 to the left to release the brakes a projecting portion 22 on the left-hand wall of opening 17 contacts member 15 adjacent the lower end of the latter thereby releasing the gripping action of the same and permitting it to be moved to the right into the position shown in Fig. 1. A suitable spring 23 secured at one end to lever 10 and at its other end to pivot pin 19 is provided for holding said lever in a predetermined relation with respect to member 15 and prevent any rattling of the same.

In the operation of the device the upper end of lever 10 is pulled to the right as seen in Fig. 1, portion 21 engaging member 15 to move the same into inoperative or non-gripping position. Further movement of lever 10 is effective to slide member 15 to the left along bar 11 thus moving tension rod 14 to the left and applying the brakes. At the instant lever 10 is released by the operative, tension rod 14 is effective to tilt member 15 which then in turn becomes effective to resist the pulling action of the brake retracting springs (not shown) on rod 14 and hold the brakes in applied position. It is thus seen that the brakes may be locked in the exact position desired, there being no slip-back whatever as is often the case with brake levers now in use.

When it is desired to release the brakes it is necessary only to push the upper end of lever 10 to the left, no additional movement being first necessary to release the locking means. Locking member 15 will be engaged by portion 22 and the lower end thereof moved toward the right upon the initial movement of lever 10 to the left. After the lower end of member 15 has been moved sufficiently to release the gripping action of the same, continued pressure on lever 10 and the simultaneous efforts of the tension rod 14 on the upper end of said member are effective to move the latter to the right thereby releasing the brakes.

A second embodiment of the invention (Fig. 5) illustrates novel means for releasing the brake at substantially the same time that the clutch mechanism engages to thereby prevent roll-back and avoid the necessity of a division of an operative's attention when he is attempting to start his car on a hillside. As shown, such means are constituted by a rod comprising two sections, 24 and 25, threadedly connected the one to the other to permit of adjustment of their combined lengths and pivotally secured at one end to the clutch pedal 25' of a vehicle. The free end of rod 24, 25 extends through an opening 26 in an extension 27 integral with locking member 15'. Mounted in a recess 28 in the upper side of rod 24, 25 is a ball 29 supported by a coil spring 30 in a manner such that a portion of the ball normally projects above the surface of the rod.

When the brake is in released position the clutch pedal may be actuated in the normal manner, the resistance of member 15', 27 to movement in either direction being sufficient to permit ball 29 to be drawn through the opening 26, said ball receding into recess 28 against the pressure of spring 30. When, however, the brake is in applied position the lower end of lever 10 and member 27 being in the left-hand position, ball 29 will be drawn through opening 26 when the clutch pedal is depressed but, if the latter is released, ball 29 encounters extension 27 moving member 15' toward a position normal to bar 11. The brakes will then be released in the same manner as if the pressure were being applied toward the left on lever 10 as pointed out above. Preferably ball 29 is so positioned on rod 24, 25 that the brakes will be released at substantially the same instant that the clutch mechanism engages.

A third embodiment of the invention is shown in Fig. 6 wherein a pawl and ratchet locking mechanism is adapted to be controlled by the movements of the operating lever, only a single movement being required of the operative to release both the brakes and the locking means therefor. In the form shown an arcuate ratchet bar 31 is pivotally secured by means of an arm 32 integral therewith to frame member 13, the pivot pin 31ª therefor lying at the center of curvature of ratchet bar 31. Brake resistance rod 14 is pivotally secured by means of a yoke 34 and a pin 35 to the free end of ratchet 31.

Ratchet 31 and hence rod 14 are adapted to be actuated by a bell crank lever 36, 37 pivotally mounted independently of arm 32 on a common pivot, the lower arm 36 of said lever being provided with a lateral projection 38 which is normally held in engagement with the lower edge of arm 32 by means of a suitable spring 39. Pressure toward the right on the upper end of lever arm 37 will thus be effective to move rod 14 to the left, applying the brakes. To lock the brakes in applied position a suitable pawl 40 adapted to engage ratchet 31 is pivotally mounted on a pin 41 secured to frame 13. A suitable spring 42 is provided for normally holding pawl 49 in engagement with the ratchet.

With the brakes in applied position, as lever arm 37 is moved toward the left, arm 36 will move into engagement with an extended portion 43 of pawl 40 moving the same to the right and disengaging the pawl from ratchet 31. The brakes will then be rendered inoperative by the unresisted tension of the brake retracting springs (not shown). A stop 44 may be provided to limit the movement of pawl 40, 43.

There is thus provided novel mechanism for actuating a resistance member and for holding the same in a desired position wherein the holding means and the movement of said resistance member are controlled by the movements of a common lever, the operative being thus required only to apply pressure to the lever in the direction of desired movement without first having to release the holding means for such lever. The tension on the resistance member may thus be increased or decreased with ease and facility. There is also provided a novel device for actuating and holding a resistance member which device is of simple construction, comprises but a small number of compactly arranged parts, may be cheaply manufactured, and may be readily installed.

Although only three embodiments of the invention have been illustrated and described, it is to be expressly understood that the same is not limited thereto nor is the same limited to use with the brakes of a vehicle but may be used in numerous capacities on many types of machinery. Various changes may also be made in the arrangement and design of parts illustrated without departing from the spirit of the invention. Reference will be primarily had, therefore, to the appended claims for a definition of the limits of the invention.

What is claimed is:

1. The combination with a resistance member of an arcuate bar, a pivoted lever, a locking member having slotted engagement with said bar and adapted to be engaged on each side by said lever, said locking member being pivotally secured to said resistance member whereby the former is held in gripping engagement with said bar, and means on said lever for engaging one side of said locking member on one side of the longitudinal center line of said bar and the other side of said member on the other side of said center line to move the same to non-gripping position to permit movement of the same by said lever in either direction along said bar.

2. The combination with a resistance member of an arcuate bar having the shape of a circular arc, an arm integral with said bar, a bifurcated lever pivotally mounted on said arm at the center of curvature of said bar, the latter extending between the bifurcated sections of said lever, a locking member pivotally connected to said resistance member and movably mounted on said bar, and means on said lever for engaging either side of said locking member to move the same along said bar.

3. In combination, an arcuate segmental bar secured to a stationary frame, a lever pivoted at the center of curvature of said bar, a locking member having an opening therein adapted to receive said bar, a pair of shoes in said opening adapted to engage opposite sides of said bar, a tension rod pivotally secured to said locking member between said bar and the center of curvature, said rod being adapted to tilt said member relative to said bar to frictionally hold said rod and member against movement in one direction, means on said lever adapted to engage one side of said locking member adjacent the upper face of said bar for moving said member against the efforts of said tension rod to inoperative position, and means on said lever to engage the other side of said member adjacent the lower face of said bar to move said member to inoperative position and render the same movable by said tension rod.

4. In combination, an arcuate segment having the shape of a circular arc, a locking member having a slot therein adapted to receive said segment, said slot being slightly longer than the width of said segment, means secured to the upper end of said member for yieldingly maintaining the latter in tilted position relative to said segment thereby locking said member against movement along the segment in response to the efforts of said means, and a lever pivoted intermediate its ends at the center of curvature of said segment and adapted to engage opposite sides of said locking member on opposite sides of the longitudinal center line of said segment to move the same to a position normal to said segment to permit said member to be moved along the segment.

5. In apparatus of the class described, a bar, a locking member having a slot therein for receiving said bar, and a pair of shoes in said slot adapted to frictionally engage opposite faces of said bar, said shoes having arcuate grooves in the outer faces thereof adapted to cooperate with arcuate beads in said slot, whereby the inner faces of said shoes will engage said bar irrespective of the angular position of said locking member relative to said bar.

6. In apparatus of the class described, a bar having the shape of a circular arc, a locking member having a slot therein adapted to receive said bar, and a pair of shoes in said slot engaging opposite sides of said bar, one of said shoes having a concave and the other a convex face in engagement with said bar, said shoes extending on either side of said locking member and having arcuate grooves in the faces opposite said concave and convex faces adapted to cooperate with complementary arcuate beads constituting the ends of said slot.

CHARLES C. STRANGE.